United States Patent Office 2,946,687
Patented July 26, 1960

2,946,687
METHOD OF MAKING VODKA

Frederick L. Jacobs, Wethersfield, Conn., assignor to Heublein, Inc., Hartford, Conn., a corporation of Connecticut No Drawing. Filed Dec. 27, 1957, Ser. No. 705,500

8 Claims. (Cl. 99—48)

My invention relates to a new and improved "spirit flow" method of manufacturing vodka, but is not limited to manufacturing vodka. The invention involves the use of a specially modified partially-activated hard-wood charcoal.

The basic method of manufacturing vodka is old and well-known. It is described, for example, in a textbook entitled "Chemistry and Technology of Wines and Liquors" by Herstein and Jacobs, published in 1948 by D. Van Nostrand Co. Inc.

As described in said textbook, the ethanol is derived from a cereal, or a mixture of cereals, or from some other source. In one well-known method, described in said text-book, a high-rectification column still is used, in order to make an original distillate, which is a mixture of ethanol and water, and in which the ethanol is designated as almost pure neutral spirits, because it contains little congeneric substances. In order to modify these congenerics and to make a finished vodka which is practically odorless, tasteless and colorless, this original distillate is flowed, as described in said text-book, through successive beds of activated carbon or through beds of charcoal. In some cases, the original distillate is initially mixed with water and said mixture is then thus filtered or flowed. In some cases, neutral spirits are diluted with water, and such mixture is thus filtered or flowed. The activated carbon or the charcoal used in this old method really acts, not as a mere filtering agent, but to modify the congenerics in order to finally produce a vodka which is substantially a mixture of pure ethanol with water, said vodka being practically odorless, tasteless and colorless.

The charcoal described in said text-book is made from a hard wood or from a mixture of hard woods, such as beech, maple, oak and hickory. These woods contain natural salts of calcium. The chief, natural calcium salt of wood is calcium carbonate, $CaCO_3$. When calcium carbonate is heated to a sufficiently high temperature, such as 700° C. to 1000° C., said calcium carbonate is decomposed by the heat to yield calcium oxide (CaO) and carbon dioxide ($CO_2$). Charcoal is made from these hard woods by the well-known distillation process. This distillation process for distilling these hard woods to make charcoal is disclosed, for example, in "Industrial Chemistry" by Riegel, 1942 edition, published by Reinhold Publishing Company. In said well-known distillation process, the hard wood material is heated in an externally heated retort to about 500° C. Hence the resultant hard-wood charcoal does not contain calcium oxide, or any appreciable percentage of calcium oxide, because the temperature of the distillation process is not sufficiently high to decompose the calcium carbonate. Since calcium carbonate is insoluble in water and also in ethanol, the calcium carbonate is not leached out of this well-known type of hard-wood charcoal by the flowing mixture of ethanol and water.

Instead of using true activated carbon or said charcoal, I use a modified hard-wood charcoal, which I designate for convenience, as being "partially activated" and thus secure a superior action on the spirits, in substantially eliminating taste, odor and color in producing a finished vodka. However, the use of said partially-activated hard-wood charcoal is subject to a disadvantage which is later explained, and which I have discovered and I eliminate.

True activated carbon is made from charcoal by various methods, in order to produce a very strong adsorbent, which very strongly retains adsorbed gases, such as adsorbed carbon dioxide. The original charcoal has relatively low adsorptive power and retention for carbon dioxide, in comparison with the activated carbon. As stated in a textbook by Lewis, Squires and Broughton, entitled "Industrial Chemistry of Colloidal and Amorphous Materials," published in 1942 by The Macmillan Company, one method of making activated carbon from charcoal is by heating the charcoal in a stream of air at 300° C.–400° C., or in a stream of steam at 700° C.–900° C., in a process of selective oxidation. The theory stated in this textbook is that by said selective oxidation, hydrocarbons or tarry matters which coat the surface of the carbon of the original charcoal or choke the fine pores of the original charcoal are burned out, while simultaneously increasing the area of the inner surface of the charcoal, and the unsaturation of its original or primary surface carbon atoms.

Said textbook by Riegel states that the effect of activating charcoal in order to produce activated carbon, is to remove the adsorbed hydrocarbons by combined oxidation and distillation by steam, or by a mixture of steam and air. The adsorbed hydrocarbons which have high boiling points are broken down to produce volatiles, which are easily evaporated and removed, with low deposition of the inactive secondary carbon. In the steam process, the charcoal is heated in an externally heated retort to 800° C.–1000° C., and a current of steam is flowed downwardly through the charge of charcoal in the retort, in order to remove the undesired hydrocarbons before they are decomposed by the high temperature to deposit the undesirable, inactive, secondary carbon. There is also some oxidation. The carbon in the retort is in the form of small granules, whose size is less than 0.01 inch.

As stated in page 21 of the 1956 edition of "The Condensed Chemical Dictionary," published by Reinhold Publishing Corporation, carbon dioxide may be used instead of steam. I use a modified and partially-activated charcoal which can easily adsorb carbon dioxide, as up to one percent of the weight of the charcoal, and from which the adsorbed carbon dioxide can be easily gradually dissolved by water at 20° C.–30° C., at ordinary atmospheric pressure of 760 millimeters of mercury.

I prepare the partially-activated hard-wood charcoal from ordinary hard-wood charcoal, by heating the previously prepared ordinary hard-wood charcoal in a kiln in the presence of a limited flow of air.

The heated hydrocarbons of the ordinary hard-wood charcoal are burned or oxidized in the kiln, through which a limited quantity of air is passed, in order to remove said hydrocarbons.

This partially-activated charcoal which is made in the kiln is superior to the original hard-wood charcoal or to true activated carbon, for the purpose of modifying the congenerics of the alcoholic spirits, in order to manufacture vodka by the spirit flow method. This partially-activated charcoal which is made in the kiln is further finally modified as later described, by adsorbing carbon dioxide on its particles, which are larger than 0.01 inch.

However, the presence of calcium oxide in the partially-activated hard-wood charcoal has a disadvantage. When a mixture of the spirits with water is flowed through a bed of said partly-activated charcoal which has not been finally modified by my method to have adsorbed carbon dioxide, the water of said mixture leaches the calcium oxide from the coarse particles of the partially-activated charcoal within the bed. The water reacts with the leached calcium oxide within the bed, to produce calcium hydroxide, $Ca(OH)_2$, which is substantially soluble in water and which is dissolved in the water within the bed. When the mixture of alcoholic spirits and water is flowed out of the last bed of partially-activated charcoal which has been made in the kiln and which does not have adsorbed carbon dioxide, into the collecting tank, the water of said mixture in the collecting tank has the dissolved calcium hydroxide. Also, the vodka which is collected by this process must be usually mixed with water, in order to manufacture a final vodka of 80-proof or 100-proof. In such cases, the dilution with water introduces more carbon dioxide which is dissolved in the added water. Also, the original mixture of alcoholic spirit and water, or its aqueous dilution, takes up carbon dioxide from the atmosphere, within the collecting tank or storage tank, thus producing carbonic acid which reacts with the dissolved calcium hydroxide to form calcium carbonate. It is possible to initially collect a clear vodka product in the collecting tank, and said clear vodka may later develop the undesirable milky haze, prior to bottling.

I have discovered that this undersirable milky haze results from the formation of very finely divided calcium carbonate by the reaction, in aqueous solution, between carbonic acid, $H_2CO_3$, and calcium hydroxide, $Ca(OH)_2$.

The glass of the bottle is made with the use of sodium carbonate, $Na_2CO_3$, as a fluxing agent, and such glass contains an excess of undecomposed sodium carbonate, which is a source of carbonate ions "$CO_3^{=}$". The calcium hydroxide which is dissolved in the water of the bottled vodka reacts with the sodium carbonate, to form calcium carbonate in the bottle.

I have discovered said reason for the formation of the undesirable milky film in the bottle.

According to my invention, I eliminate the presence of calcium hydroxide in the collected vodka and in the bottled vodka, thus preventing the formation of the objectionable, finely-divided calcium carbonate.

For this purpose I use a final modification of said initial, partially-activated hard-wood charcoal. This initial partially-activated charcoal is finally modified to have absorbed carbon dioxide, and such finally modified, partly-activated charcoal is used as the so-called filtering agent. As above noted, the function of this so-called filtering agent is really not to filter, but to partly or wholly modify the congenerics of the neutral spirits of the vodka, in order to manufacture, as one example, a finished vodka which is practically odorless, tasteless and colorless.

For this purpose, after the original hard-wood charcoal has been heated in the kiln to produce the initial partially-activated charcoal, said initial partially-activated charcoal is expelled from the kiln through the usual, externally cooled cooler, so that the temperature of the initial partially-activated charcoal which emerges from said cooler is ordinary room temperature of 20° C.-30° C. This cooled, partially-activated charcoal is directly and immediately filled into impervious bags, which are made of paper, and which are liners of reinforcing cloth bags.

Each bag is held upright, with its open mouth at its top. A vertical and cylindrical pipe is immediately inserted into this bag through its open top, until the bottom of the pipe is at the bottom of the bag. The bottom end of this pipe is tapered and has an opening at its tip, and said pipe has perforations in its vertical side wall at the bottom of said pipe. The upper end of this pipe is connected outside of the bag to a source of carbon dioxide gas under pressure, through a valve-controlled and flexible connecting pipe. The valve of this connecting pipe is opened, so that carbon dioxide gas flows into the bag at 20° C.-30° C., until the pieces of initial partially-activated charcoal uniformly and promptly adsorb the carbon dioxide gas in the ratio of one-hundredth of a gram of carbon dioxide, per one gram of said partially-activated charcoal, to produce the finally modified partially-activated hard-wood charcoal which I used in the filtering bed or beds.

In order to measure the weight of the adsorbed carbon dioxide, the tank from which the carbon dioxide flows, is mounted on a scale. This adsorption of carbon dioxide is under ordinary external atmospheric pressure of 760 millimeters of mercury at 20° C.-30° C. This ratio of adsorption of the carbon dioxide gas is very low, because one gram of the partially-activated charcoal adsorbs only about five cubic centimeters of the gaseous carbon dioxide. When the pieces of initial partially-activated hard-wood charcoal have thus adsorbed the gaseous carbon dioxide at the rate of 0.01 gram of carbon dioxide per one gram of said partially-activated hard-wood charcoal, in order to produce the finally modified partially-activated charcoal which I use in the bed or beds, the supply of carbon dioxide is promptly discontinued and the tube is promptly removed, and the bag is promptly sealed or tied, and the finally modified, partially-activated charcoal is ready for use in the spirit flow method. Due to the relatively weak retention of the adsorbed carbon dioxide by the finally modified partially-activated charcoal, as compared with the high retentive power of true activated carbon, the adsorbed carbon dioxide is easily and uniformly and gradually dissolved in water at 20° C.-30° C.

When the mixture of the alcoholic spirits and water is flowed through a bed of this finally modified, partially-activated charcoal, at 20° C.-30° C., and under ordinary external atmospheric pressure of 760 millimeters of mercury, the water of said mixture easily and promptly dissolves some of the adsorbed carbon dioxide, thus forming carbonic acid, $H_2CO_3$, within the bed. The water also promptly and easily leaches the calcium oxide out of the charcoal within the bed, and said leached calcium oxide reacts with the water within the bed, to form an aqueous solution of calcium hydroxide, $Ca(OH)_2$, within the bed. The concentration of the carbonic acid within the bed is sufficient to react with all of the calcium hydroxide to calcium carbonate within the bed. The calcium carbonate which is thus formed within the bed is ordinarily retained within the bed, so that the mixture of alcoholic spirits and water which enters the collecting tank after having passed through all of the consecutive beds, is free or substantially free from calcium compounds, particularly calcium hydroxide. If any calcium carbonate which is formed in the bed flows out of said bed in the mixture of alcoholic spirits and water, said calcium carbonate is of a particle size which is sufficiently large to permit the separation of said calcium carbonate, together with the separation of other suspended solids, by means of well-known clarifying or filtering pads which are located after the last bed and anterior the collecting tank. Such well-known clarifying or filtering pads are made of cellulose and of asbestos fibers.

The mixture of alcoholic spirits and water which is collected in the collecting tank, since it is free from calcium hydroxide or substantially free from calcium hydroxide, is inert to carbon dioxide which may be dissolved in said mixture. Hence the objectionable milky haze cannot be formed during storage prior to bottling, or in the bottle.

As one example, but without limitation thereto, the complete method may be as follows:

The original distillate

This is produced in the usual manner by a high-rectification column still. This original distillate has 95% to 96% of substantially pure neutral grain spirits, and 4% to 5% by volume of water. This mixture has a high proof of 190 to 192, as calculated in the system of the United States of America, in which the proof in a mixture of ethanol and water is twice the percentage by volume of the ethanol.

Diluting the original 190–192 proof distillate

The original distillate is mixed with water, to provide a mixture which has, by volume, 55% of substantially pure neutral grain spirits, and 45% of water, corresponding to 110-proof.

In order to intimately and uniformly mix a large batch of the original 190–192 proof distillate with water, to a lower 110-proof, the mixing is done at 20° C.–30° C., under ordinary external atmospheric pressure, in a mixing tank, by bubbling air from a source of compressed air through the intermixed ingredients. This bubbled air contains some carbon dioxide, which remains dissolved in the 110-proof mixture, when it enters the first bed of modified, partially-activated charcoal.

Flowing the 110-proof mixture through the successive beds of modified, partly activated hard-wood charcoal This is done at 20° C.–30° C., under ordinary external atmospheric pressure of 760 millimeters of mercury. The 110-proof mixture is flowed consecutively through a selected number of consecutive beds of said material. As above noted, the water of this 110-proof mixture leaches the calcium oxide out of the charcoal within each bed and converts the the calcium oxide to calcium hydroxide which is dissolved in the water within each bed.

The water also simultaneously dissolves only some of the adsorbed carbon dioxide within each bed, thus providing enough carbonic acid in sufficient concentration in the water within each bed, to immediately react said carbonic acid with the dissolved calcium hydroxide within each bed, to form calcium carbonate promptly within the respective bed. The calcium carbonate remains in the respective bed, or, if it flows out of the respective bed in unison with the 110-proof mixture, said calcium carbonate is of sufficiently large particle size to be easily separated by filtration, as above mentioned.

Clarifying the 110-proof mixture which has flowed through the last bed, anterior the collecting tank This is done by said well-known clarifying filter, in order to separate suspended solids, which include any calcium carbonate which may flow out of the last bed.

Diluting the collected 110-proof mixture

This collected 110-proof mixture is diluted and mixed with water, in order to provide a 100-proof or an 80-proof vodka. This mixture is done by agitation by means of compressed air, which is bubbled through the mixture and introduces some carbon dioxide since the bubbled air is atmospheric air and contains some carbon dioxide. However, the 110-proof mixture is free or substantially free from calcium hydroxide so that any carbon dioxide which is thus commercially introduced, cannot produce the objectionable milky effect in the unbottled vodka or produce the objectionable film of calcium carbonate in the bottle.

The final vodka is stable and remains practically odorless, tasteless, and colorless.

The invention includes many omissions and additions and changes in the above preferred disclosure.

By providing the pieces of charcoal within each bed with one percent weight of adsorbed carbon dioxide, I provide each piece of charcoal with more than enough carbon dioxide for the desired reaction, during the normal life of the bed. These beds of charcoal must be renewed at stated intervals.

As one example, if 110-proof spirits are treated, said 110-proof spirits are in continuous contact with the finally modified partially-activated charcoal in the beds, during a minimum period of eight hours.

The invention is further disclosed and it is defined in the appended claims.

I claim:

1. A method of treating a mixture of ethanol and water, which consists in flowing said mixture through a bed of pieces of charcoal which have adsorbed carbon dioxide and which also have calcium oxide; reacting said calcium oxide with said water within said bed to form calcium hydroxide which is dissolved in said water within said bed; also dissolving some of said adsorbed carbon dioxide in said water within said bed to form carbonic acid within said bed; and reacting said dissolved calcium hydroxide with said carbonic acid within said bed to form calcium carbonate within said bed.

2. A method according to claim 1, in which said mixture is flowed through said bed at substantially 20° C.–30° C.

3. A method according to claim 2, in which said mixture is flowed through said bed under an external atmospheric pressure of substantially 760 millimeters of mercury.

4. A method according to claim 1, in which said mixture contains by volume, substantially 55% of ethanol and 45% of water.

5. A method according to claim 1, in which said mixture is an original distillate which has by volume, substantially 95% to 96% of substantially pure ethanol and substantially 4% to 5% of water.

6. A method according to claim 1, in which said mixture is an aqueous dilution of an original distillate, said original distillate having, by volume, substantially 95% to 96% of substantially pure ethanol and 4% to 5% of water; and said aqueous dilution having, by volume, substantially 55% of said ethanol and 45% of water.

7. A method of treating a mixture of ethanol and water, which consists in flowing said mixture through a bed of pieces of charcoal; said pieces of charcoal containing calcium oxide; reacting said calcium oxide with said water within said bed to form calcium hydroxide within said bed; and supplying enough carbon dioxide to said mixture within said bed to form enough carbonic acid within said bed to react with substantially all said calcium hydroxide within said bed to form a corresponding quantity of calcium carbonate within said bed.

8. A method of treating a mixture of ethanol and water which comprises treating partially activated charcoal with carbon dioxide, flowing said mixture of ethanol and water through a bed of pieces of said charcoal which contain adsorbed carbon dioxide and which also have calcium oxide; reacting said calcium oxide with said water within said bed to form calcium hydroxide which is dissolved in said water within said bed; also dissolving some of said adsorbed carbon dioxide in said water within said bed to form carbonic acid within said bed; and reacting said dissolved calcium hydroxide with said carbonic acid within said bed to form calcium carbonate within said bed.

References Cited in the file of this patent

UNITED STATES PATENTS

| | | |
|---|---|---|
| 159,450 | Reford | Feb. 2, 1875 |
| 736,098 | Highton | Aug. 11, 1903 |
| 2,054,006 | Shoeld | Sept. 8, 1936 |